United States Patent [19]

Gruzling et al.

[11] 4,428,735
[45] Jan. 31, 1984

[54] PROPELLER MOUNT FOR ICEBREAKER

[75] Inventors: Joe Gruzling; Bengt Johansson; Arno Keinonen; Colin Revill; Vlodek Laskow, all of Calgary, Canada

[73] Assignee: Arctic Pilot Project Inc., Calgary, Canada

[21] Appl. No.: 342,708

[22] Filed: Jan. 25, 1982

[51] Int. Cl.³ .............................................. B63H 21/24
[52] U.S. Cl. ....................................... 440/76; 114/40; 114/67 R; 440/67; 440/71
[58] Field of Search ................... 114/40, 41, 56, 57, 114/77 R, 77 A, 242, 246, 67 A; 440/49, 52, 33, 76, 78, 88, 89, 112, 111, 900

[56] References Cited

U.S. PATENT DOCUMENTS

| | | | |
|---|---|---|---|
| 2,692,570 | 10/1954 | Costa | 440/76 |
| 3,223,067 | 12/1965 | Horan | 440/112 |
| 3,580,204 | 5/1971 | Burmeister | 114/67 A |

*Primary Examiner*—Galen L. Barefoot
*Assistant Examiner*—Jesus D. Sotelo

[57] ABSTRACT

A propeller mount for deflecting ice away from the propeller of an icebreaker includes a wedge-shaped body, the front end of which is pointed, and the remainder of which flares rearwardly to direct ice outwardly away from the propeller assembly. By providing bubblers in the sides of the body near the front end thereof, outward deflection of ice by the mount is promoted. The rear of the body is also slightly wedge-shaped to provide a similr wedging action at the stern for steering ice away from propellers.

2 Claims, 2 Drawing Figures

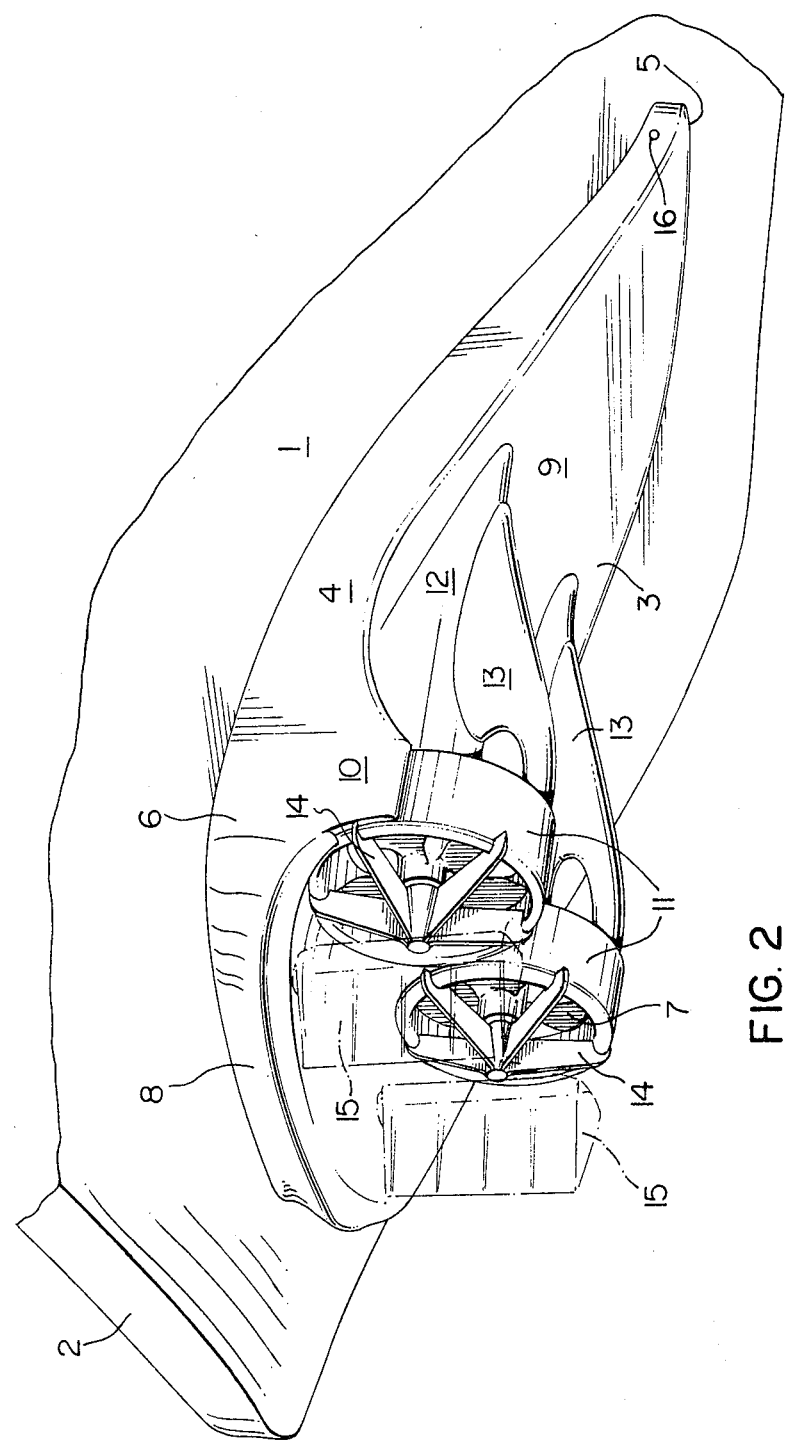

PROPELLER MOUNT FOR ICEBREAKER

BACKGROUND OF THE INVENTION

This invention relates to a propeller mount for ships, and in particular to a propeller mount for an icebreaker.

In the past, in the design and construction of the sterns of icebreaker hulls, most attention has been directed to providing sufficient clearance between the hull and the propellers that ice passes therebetween. In general, the result has been open stern designs, which do not force ice in any particular direction. Stern designs utilizing nozzles surrounding the propellers are considered to be undesirable for icebreakers, because nozzle clogging is likely to occur when large pieces of ice are drawn against the nozzle by suction. The result is vibration and a decrease in the thrust generated by the propellers.

There is nothing in the Canadian or U.S. patent literature suggesting a solution to the problem of propeller fouling by ice. The object of the present invention is to at least partially alleviate this problem.

SUMMARY OF THE INVENTION

Accordingly, the present invention relates to a propeller mount for a ship propeller assembly comprising an elongated body for mounting on the hull of a ship proximate the stern thereof, said body, when viewed from below, being substantially triangular, and, when mounted on a hull, a line through a front vertex and the center of the opposite side of the body being in substantially the same vertical plane as the longitudinal axis of the hull, whereby, in use, the body deflects ice rearwardly and outwardly away from the propeller assembly.

BRIEF DESCRIPTION OF THE DRAWINGS

The invention will now be described in greater detail with reference to the accompanying drawings, which illustrate a preferred embodiment of the invention and wherein:

FIG. 2 is a schematic perspective view from below and the rear of the propeller mount of FIG. 1.

DESCRIPTION OF THE PREFERRED EMBODIMENT(S)

Figure 1:
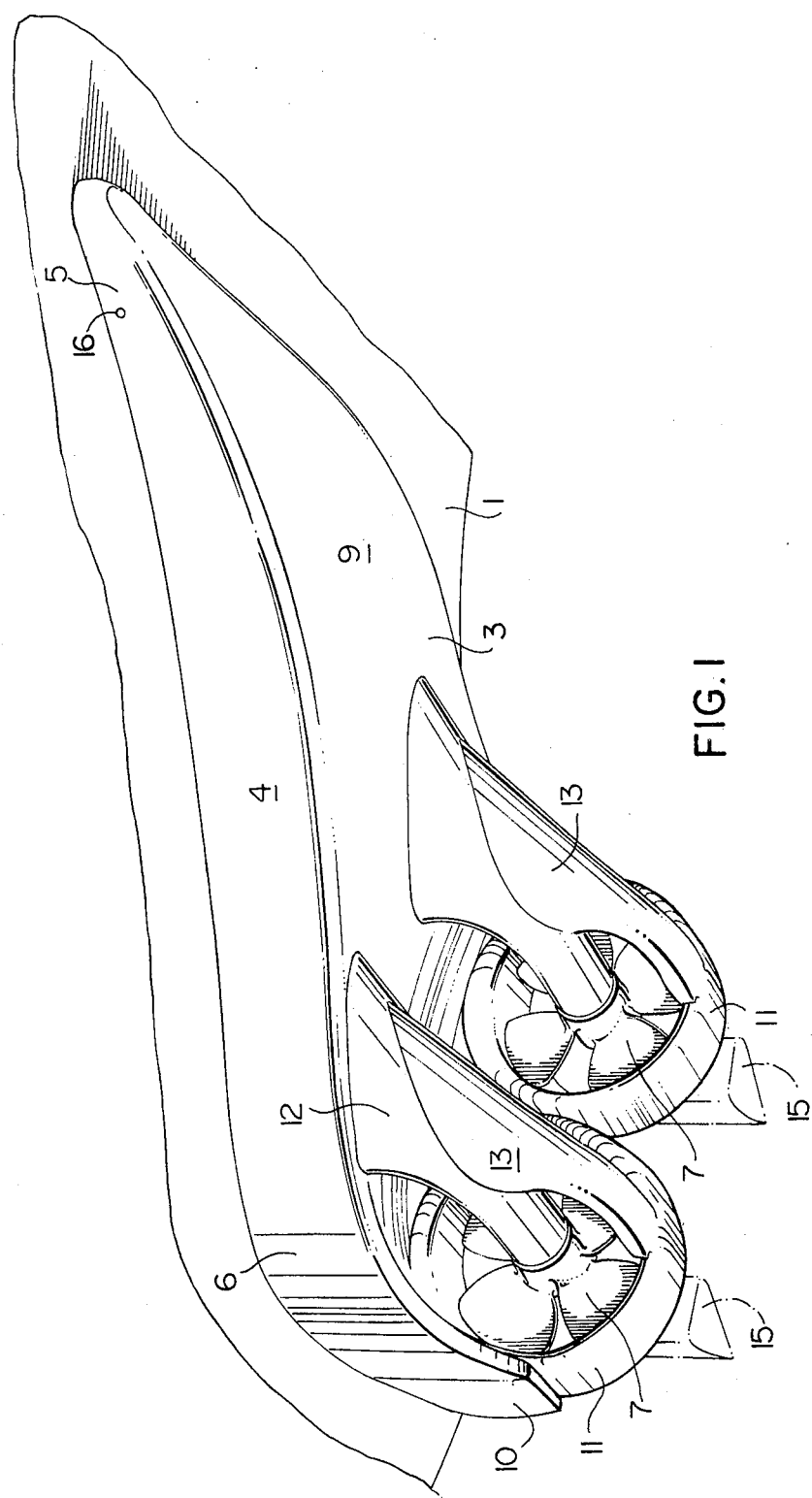
FIG. 1 is a schematic perspective view from below and the front of a propeller mount in accordance with the present invention.

With reference to the drawings, the propeller mount of the present invention is intended for mounting on a hull 1 of an icebreaker or the like near stern 2 thereof. While not shown, it is to be understood that the hull 1 is normally slightly transversely concave, i.e., the propeller mount is located in a slight depression in the hull 1. The propeller mount is defined by a wedge-shaped body 3. The body 3 is generally triangular when viewed from below and includes a top surface (not shown) which conforms to the bottom surface of the hull 1 to which the body 3 is attached. Planar sides 4 extend downwardly from the top surface. The sides 4 diverge rearwardly from a front vertex 5 to a wide rear portion 6 in the area where propellers 7 are mounted. At the wide rear portion 6, the sides 4 of the body 3 are convex, and converge rearwardly to an arcuate rear surface 8. The central portion of the rear surface 8 slopes downwardly and slightly outwardly which prevents the downward movement of ice into the propellers. While the rear surface of the body 3 is shown as being arcuate, such surface may also be wedge-shaped, i.e., V-shaped when viewed from below for promoting the deflection of ice from the propeller area, particularly during rearward movement. A planar bottom surface 9 extends between the sides 4 and rear surface 8 of the body 3. Obviously, the body 3 would be located centrally of the bottom of the hull 1, i.e., a line through the vertex 5 and the center of the rear surface 8 lies in the same vertical plane as the longitudinal axis of the hull 1 when the body 3 is installed on the hull. The hull 1 above the body 3 is submerged during ice operations to an extent such that the breaking of ice during astern operations (rearward movement) is effected mainly by the hull 1.

At the area of the wide rear portion 6 of the body 3, wings 10, which are integral with the body 3, extend downwardly beyond the bottom surface 9 for protecting the sides of propeller nozzles and for helping to prevent the suction of ice to the nozzles. The propeller nozzles include annular propeller shields 11 which form part of propeller mounting assemblies. Such mounting assemblies include the shields 11 and generally cylindrical rearwardly tapering casings 12 for supporting the propeller shafts (not shown). An ice deflector arm 13 extends downwardly and rearwardly from near the front end of each casing 12 to the bottom centre of the shield 11. The arm 13 serves to deflect ice away from the propeller blades and shields, and adds to the strength of the nozzle. The outer end of each propeller shaft is supported by a stator 14 on the rear of the shield 11 in front of a rudder 15. The stator 14 is defined by a central hub, which may include a propeller shaft support bearing with a plurality of arms extending radially between the hub and the annular shield 11. The stator 14 may be designed to redirect the waterflow behind the propeller, thus adding to propeller thrust.

It will be appreciated that the propeller mount can be used with a single or double propeller assembly. Bubblers, i.e., devices for producing bubbles can be mounted in the body 3 adjacent the vertex 5, so that bubbles are expelled through orifices 16 in the sides 4. Of course, the bubblers can be used along essentially the entire length of the sides 4. The use of such bubblers promotes the longitudinal and outward movement of pieces of ice away from the propellers 7.

In tests, using a model of a hull and the mount of the present invention, in general, the mount caused the flow of water to separate and by-pass the propellers 7. The use of air bubblers strengthened the flow, and reduced ice-hull friction.

Thus, there has been defined a relatively simple propeller mount, which (with or without an air bubbler system) promotes the flow of ice away from a vessel's propellers.

Further modifications and alternative embodiments of the invention will be apparent to those skilled in the art in view of the foregoing description. Accordingly, this description is to be construed as illustrative only and is for the purpose of teaching those skilled in the art, the manner of carrying out the invention. It is further understood that the form of the invention herewith shown and described is to be taken as the presently preferred embodiment. Various changes may be made in the shape, size and general arrangement of components, for example, equivalent elements may be substituted for those illustrated and described herein, parts may be used independently of the use of other features, all as will be apparent to one skilled in the art after having the benefits of the description of the invention.

What we claim is:

1. A propeller mount for a ship propeller assembly comprising an elongated body for mounting on the hull of a ship proximate the stern thereof, said body when viewed from below being substantially triangular and, when mounted on a hull, a line through a front vertex and the centre of the opposite side of the body being substantially the same vertical plane as the longitudinal axis of the hull, said body includes:

(a) a top surface which conforms to the bottom surface of the hull on which the body is mounted;

(b) a pair of substantially planar sides and an outwardly sloping rear, said sides diverging rearwardly from said front vertex to a wide rear portion in the area of the propeller assembly and converging toward said rear of the body;

(c) said body being wedge-shaped when viewed from said side;

(d) said wide rear portion being arcuately shaped; whereby in use the body deflects ice rearwardly and outwardly away from the propeller assembly.

2. A propeller mount according to claim 1, including bubbler means in said body near the front end thereof for producing bubbles which further promote the deflection of ice rearwardly and outwardly away from the propeller assembly.

* * * * *